J. W. HOAG.
SPEED GOVERNOR.
APPLICATION FILED APR. 28, 1914.
1,247,834.
Patented Nov. 27, 1917.
3 SHEETS—SHEET 1.
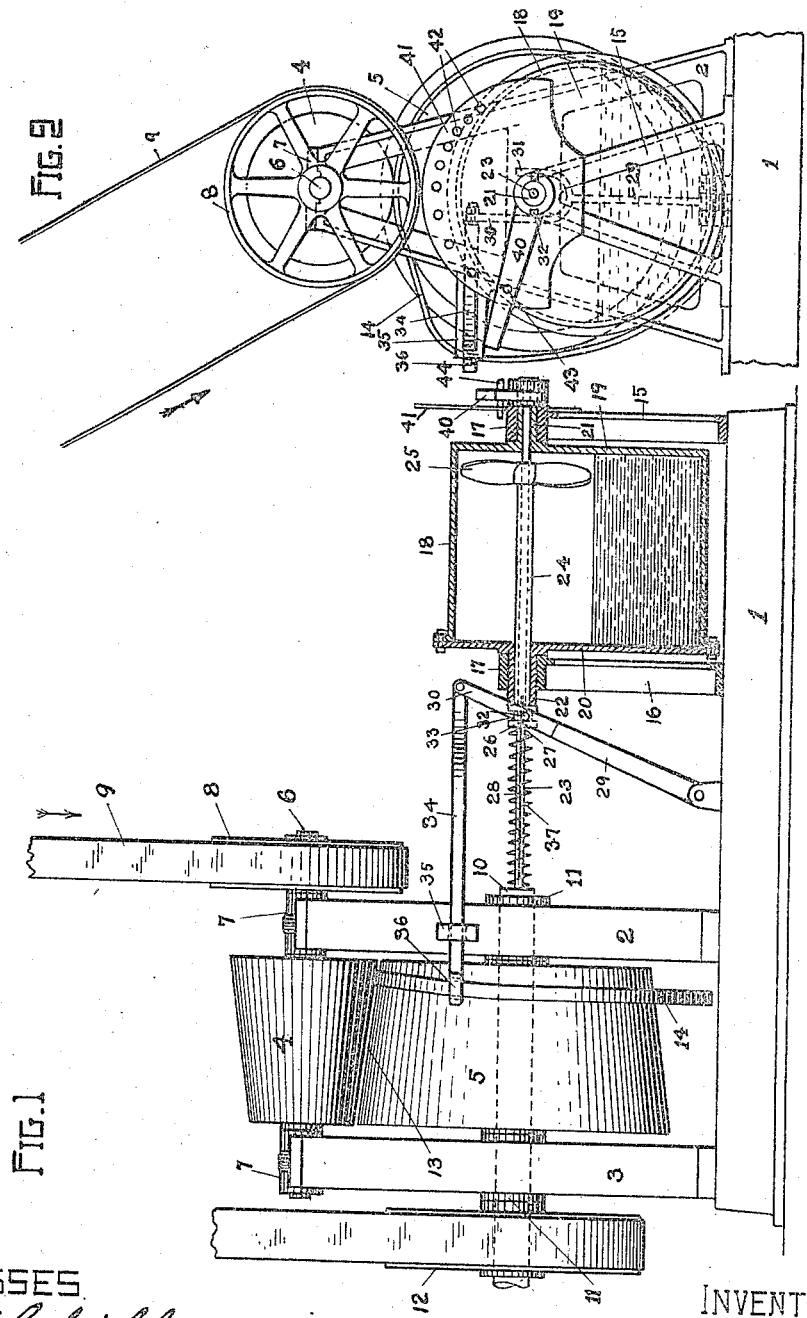
WITNESSES
F. V. Schiller.
M. Parker.
INVENTOR
James W. Hoag
By Marcus S. Levie
his Atty.

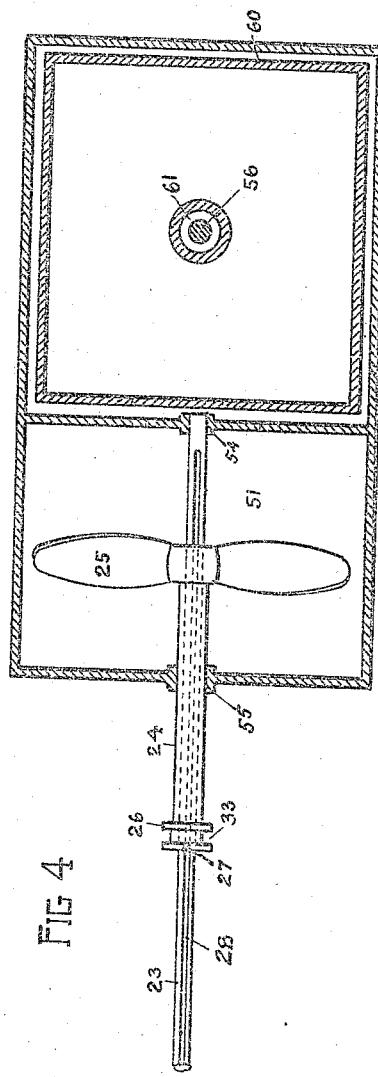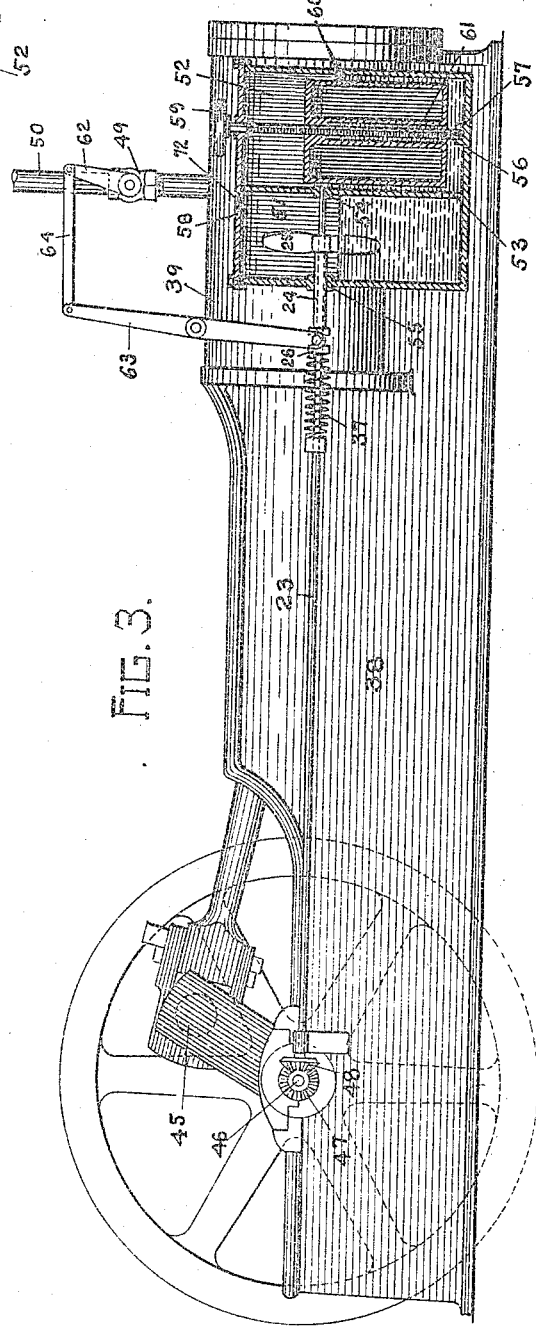

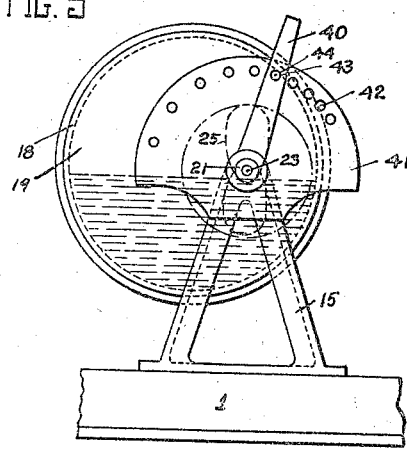
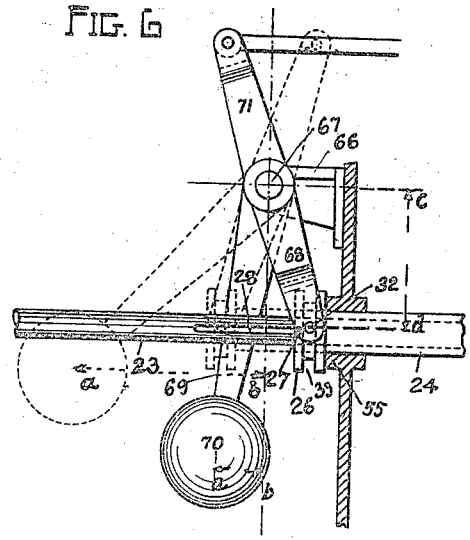
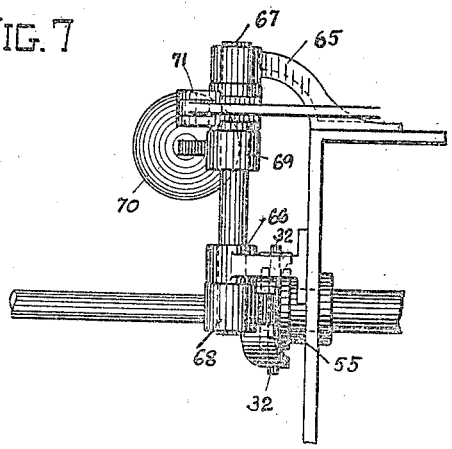

UNITED STATES PATENT OFFICE.

JAMES W. HOAG, OF OAKLAND, CALIFORNIA.

SPEED-GOVERNOR.

1,247,834.  Specification of Letters Patent.  Patented Nov. 27, 1917.

Application filed April 28, 1914. Serial No. 834,934.

*To all whom it may concern:*

Be it known that I, JAMES W. HOAG, a citizen of the United States, residing at Oakland, in the county of Alameda and State of California, have invented a new and useful Speed-Governor, of which the following is a specification.

My invention relates to improvements in speed governors, which are connected to a shaft, driven by a prime motor, or by a belt connecting to the main line of shafting running in a mill or factory and supplying power to the several machines operating in the plant, and it has for its object to maintain said driven shaft at a uniform rate of speed.

With this in view, I attach the governor shaft direct to said driven shaft, so as to run in unison with it, or I gear it to said shaft, so as to run at another proportionate rate of speed, higher or lower, than the speed of said driven shaft, as the requirements might be, and I provide the governor shaft with an actuating member, comprising a screw propeller, mounted on a sleeve, slidably keyed to said shaft, so as to be capable of moving longitudinally along the shaft, and to rotate in unison with it. I further provide a receptacle, containing a liquid medium, said receptacle inclosing the said screw propeller, and I furnish it with means to raise or lower the level of the liquid medium in said receptacle, so as to immerse the blades of said propeller to the desired depth. The reaction of the liquid on the rotating blades causes them to advance forward and move the sleeve along the governor shaft, compressing a spring to a greater or less extent, depending on the depth of immersion of said blades in the liquid, and upon the speed of rotation of the shaft. The sleeve is connected to the driving shaft or to the prime motor in such a way, as to determine, by its location along the governor shaft, the ratio of the gearing between the driving and the driven shafts, required to maintain the latter at a very nearly constant speed, or to determine the rate of supply of energy to the prime motor for the same purpose of preserving a constant speed of said driven shaft.

Referring now to the drawings hereunto annexed for a detailed description of my invention:

Figure 1 is a sectional side elevation of a governor, as applied to a variable speed counter shaft of the friction cone type.

Fig. 2 is an end elevation of the same.

Fig. 3 is a sectional side elevation of a governor, as applied to a steam engine, the receptacle for the liquid, and the means for raising and lowering the surface of said liquid is shown in a modified form.

Fig. 4 is an enlarged sectional plan of the governor, showing in detail the governor shaft, sleeve and propeller, the receptacle for the liquid, shown in section, is of the kind illustrated in Fig. 3.

Fig. 5 is an end elevation of the receptacle for the liquid, of the form shown in Figs. 1 and 2, the arm 40 being shown in the position, when the surface of the liquid is elevated.

Fig. 6 is a detail, drawn in an enlarged scale, of a modification of the means to counterbalance the action of the propeller, and Fig. 7 is a plan view of the same.

1 is a base, provided with the standards 2 and 3, which serve to support the cone friction pulleys 4 and 5 of a variable speed counter shaft. At the top of said standards a driving shaft 6 is mounted in the bearings 7, 7, and is provided with a tight pulley 8; a belt 9 connects the pulley 8 with a line of shafting, which is not shown in the drawings and which supplies power to the entire plant of machinery located in the building. The belt is driven in the direction, shown by the arrow. The driving cone friction pulley 4 is keyed to said shaft 6. The driven shaft 10 is mounted in the bearings 11, 11, and is provided with the cone friction pulley 5, keyed to it, and with the tight pulley 12. The cones 4 and 5 may be made of the same, or of different diameters, according to the ratio of gearing required between the driving and the driven shafts; they are made of the same taper, and are set between the standards 2 and 3, so as to face in opposite directions. The bearings 7, 7 and 11, 11 are so arranged on the standards, as to cause the shafts to run parallel; and the distance between them is such, as to bring the adjacent surfaces of the two cones close together, leaving a narrow space 13 between them. A short endless belt 14 is made to run loosely over one of the cones, fitting tightly in the narrow space 13, thus forming a friction contact between the surfaces of the cones.

The relative speeds of the cones depend upon the particular location of the belt 14 along the narrow space 13; when brought nearer to the smaller end of the driven cone 5, the relative speed of said cone is increased, while when carried farther away, it is diminished.

The base 1 also carries the standards 15 and 16, which are provided with the bearings 17, 17, arranged to run in line with the bearings 11, 11 on the standards 2 and 3.

A receptacle for a liquid medium, comprising the cylindrical casing 18, provided with the head 19, cast integral with it, to close one end, and a removable head 20 to close the other end, is mounted in the bearings 17, 17 on the standards 15 and 16 by means of the trunnions 21 and 22, carried by the heads 19 and 20. The receptacle is only partly filled with the liquid, which naturally occupies the lower portion of it. The trunnions 21 and 22 are placed eccentrically with the casing 18, as shown in Fig. 2 and Fig. 5. The trunnion 21 projects beyond the bearing 17, and carries the arm 40, whereby the receptacle may be made to turn around the trunnions, so as to raise or lower the center of the cylindrical casing 18, and thus elevate or lower the surface of the liquid.

A segment 41 is secured to the standard 15, and is provided with a number of holes 42, spaced on a circle concentric with the trunnions, and a hole 43 is drilled in the arm 40 to register with the holes in said segment.

When the arm 40 is turned, so as to bring the surface of the liquid to the desired elevation, as shown in Fig. 5, it is made fast by passing a pin 44 through the arm and through any one of the holes in the segment, with which it registers.

The trunnion 21 is bored out to serve as a bearing for the governor shaft 23, while the trunnion 22 is bored out to form a bearing for the sleeve 24, fitted around the governor shaft. The sleeve 24 carries a small screw propeller 25, secured to it at one end next to the trunnion 21, and from there it extends through and beyond the trunnion 22, where it terminates with the grooved collar 26. A pin 27, secured in the collar 26, engages a slotted key way 28, cut for some distance in the governor shaft 23, connecting the sleeve to said shaft, so as to revolve together, while permitting the sliding motion of the sleeve along said shaft.

The governor shaft 23 is secured at one end to the driven shaft 10, passes through the sleeve 24, and terminates at the other end within the trunnion 21.

A lever 29 is pivoted at one end to the base 1, and is provided at the other end with the forked prongs 30 and 31 straddling the collar 26. A pin 32, held fast in one of said prongs, is made to engage the groove 33 in said collar, thus coupling them together. A belt shifting bar 34 is pivoted at one end to the prong 30, while the other end, after passing through a guiding arm 35 on the standard 2, engages the endless belt 14 by means of the loop 36. A spiral compression spring 37 is placed around the governor shaft between the collar 26 and the driven shaft 10, for the purpose of counteracting the action of the propeller 25, as hereinafter set forth.

The operation of the device is as follows:

The governor is first adjusted for the speed required, by turning the arm 40 from the position shown in Fig. 1, to some position shown in Fig. 5, causing the casing 18, containing the liquid to turn around the trunnion 21, thus elevating the surface of the liquid, and causing the propeller blades to become immersed to a greater or less extent, according to the angle the arm 40 has been turned. The pin 44 is then passed through the arm, and through one of the holes in the segment 41, and the device is ready for operation.

The following is the action of the governor:

The shaft 6 is driven by the belt 9 from a line of shafting above (not shown) with a very irregular speed, and the object of the governor is to transmit that irregular speed to the driven shaft 10, transforming it at the same time into a uniform speed.

From the arrangements of the cones 4 and 5, the belt 14, and the shifting mechanism, it is seen that the ratio of speeds between the two cones depends upon the particular position of the belt 14 along the narrow space 13, and upon the position of the belt shifting mechanism, and that for any particular ratio of speeds between the aforesaid cones there is a corresponding force of the compression spring.

Let us suppose that the shaft 6 is running for a short time with a uniform speed, equal to its average, and that to obtain the speed required for the shaft 10, the belt 14 has to be at the middle of the narrow slot 13. The driven shaft 10, the governor shaft 23, and the propeller sleeve or shaft 24, will revolve for that short length of time at the required uniform speed. The blades of the revolving propeller, being partly immersed in the liquid, will force said liquid backward toward the trunnion 21, while the reaction of said liquid will force the propeller in an opposite direction against the action of the spring 37.

For the same propeller the reaction of the liquid will vary with the velocity with which the liquid is moved backward, and with the weight or with the volume of liquid acted upon. When the velocity remains constant, the force of reaction of the liquid will vary with the volume of the liquid acted upon only, and this volume depends upon the depth of impression of the propeller blades in the liquid.

In adjusting the governor to the required speed by turning the arm 40, such an angle of turning was chosen, as to elevate the surface of the liquid, so as to immerse the propeller blades in the liquid to a depth, required to cause a reaction on said blades just sufficient to balance the force of compression of the spring 37, when the belt 14 is held at the middle of the narrow slot 13 by the shifting mechanism.

So long as the driving shaft 6 will run with a uniform speed, the belt 14 and the shifting mechanism will remain in the same position, the force of reaction of the liquid and the force of compression of the spring will remain balanced.

When the shaft 6, Fig. 1, begins to run at a higher rate of speed than its mean, the belt 14 remaining at the middle of the narrow space 13 as before, the driven shaft 10, together with the governor shaft 23, and the propeller 25, will also begin to move at a proportionately higher rate of speed. The reaction of the liquid upon the propeller blades will instantly increase, overbalancing the opposing force of the spring 37, and will move the propeller and all the belt shifting mechanism to the left up to such a point, where the force of the spring 37 will increase sufficiently to again balance the force of the reaction of the liquid. The advance of the shifting mechanism to the left will cause the belt 14 to change the point of friction contact between the cones 4 and 5, changing the ratio of speeds, so as to lower the speed of the driven cone, bringing it very near back to the normal speed.

When the driving shaft 6 will run with a slower speed than the mean, the action will be reversed. The diminished speed of the driven shaft 10, and of the governor shaft 23, will cause the propeller 25 to move slower in the immersed liquid, diminishing the reaction of said liquid. The spring 37 will expand to a point, where its tension will become diminished to the same extent, and while so expanding, will cause the belt shifting mechanism to move to the right, thus changing the ratio of gearing between the cones 4 and 5, so as to increase the speed of the latter, bringing it back to the normal speed.

From this description it is evident that the relative speed of the driven shaft 10 to that of the line of shafting in the building is automatically changed at every instance when there is a tendency for the said driven shaft to speed up, or to slow down, due to a change in resistance offered to it, or to any one of the machines, which receive power from it; or due to a change in the supply of energy to the prime motor which is driving the line of shafting. Under any one of these conditions the energy supplied by the prime motor to the line of shafting will be distributed in such a way between the driven shaft 10 and the rest of the machines receiving power from the said line of shafting, as to supply the exact amount of energy to the driven shaft 10, required to run it at a constant speed under a variable load. Whenever a change in ratio of speeds between the cone pulleys 4 and 5 takes place there is a similar change in the ratio of speeds of the driven shaft 10 and the line of shafting in the building. The driven shaft 10 is running at a constant rate of speed, while the line of shafting in the building together with all the rest of the machines driven by it will tend to slow down and thus absorb less energy when there arises a tendency for the driven shaft 10 to slow down, and said line of shafting will speed up, absorbing more energy when the tendency of the driven shaft is to speed up.

The governor can be very readily adjusted so as to maintain the driven shaft at a uniform speed, higher or lower, than the one above stated, the readjustment being made without stopping the machine.

For the adjustment of the governor to increase the speed of the driven shaft, the arm 40, shown in Fig. 5, is turned to the left, thus lowering the surface of the liquid, and diminishing the depth of immersion of the propeller blades. The mass of liquid acted upon being thus diminished, the force of the reaction will become insufficient to counteract the tension of the spring 37, and the latter will expand, forcing the belt shifting mechanism to the right, thus changing the ratio of the gearing between the driving shaft 6 and the driven shaft 10, increasing the speed of the latter. For diminishing the speed of the driven shaft the arm 40 is turned to the right, elevating the surface of the liquid, and increasing the depth of immersion of the propeller. The reaction of the liquid on the propeller will increase, forcing the latter to move to the left, and shift the belt 14, so as to diminish the speed of the driven shaft 10.

From the description above it is evident, that the governor is capable of sustaining a driven shaft at a uniform rate of speed, while allowing the driving shaft to maintain all its irregularities of motion, by automatically changing the ratio of gearing between the driving and driven shafts.

The governor may also be employed to sustain a shaft of a primary motor at a uniform rate of speed, by acting upon the source of supply of energy to the said motor. Fig. 3 illustrates an application of my invention to an ordinary steam engine.

The actuating mechanism of the governor, comprising the governor shaft 23, the sleeve 24, the screw propeller 25, the grooved collar 26, and the compression spring 37, are shown to be the same as in Fig. 1.

The receptacle for the liquid, and the means for raising and lowering the surface of the said liquid, for the purpose of adjusting the governor to the required speed, may also be made the same as described above. Here, however, I illustrate a modification of a receptacle, and means to raise the surface of the liquid, which can be applied just as well.

38 is the frame of a steam engine, 39 the engine cylinder, 45 the crank, 46 the shaft. A pair of bevel gears 47 and 48 connect the engine shaft with the governor shaft 23. A receptacle for a liquid medium is preferably placed near the throttle valve 49, located in the steam delivery pipe 50 of the engine. The receptacle for the liquid medium, shown in sectional elevation in Fig. 3 and in a sectional plan, drawn to a larger scale, in Fig. 4, consists of the box 51 and the storage reservoir 52, lying adjacent, and communicating with it through the port 53. The box 51 is provided with a bearing 54, to receive the end of the governor shaft 23, and with a bearing 55, to fit the sleeve 24 of the propeller 25. The storage reservoir 52 is provided with a threaded rod or screw 56, which rests at the bottom in a pivot bearing 57, and passes through the cover 58, terminating at the top with the hand wheel 59. Inside the storage reservoir is placed the displacer 60, which consists of a rectangular body of metal, made hollow to reduce the weight, and is provided with a central core 61, which is tapped at the upper end to fit the screw 56. The displacer may be raised or lowered in the reservoir by turning the screw 56. To fill the reservoir with liquid, the displacer 60 is first raised to the very top, then the liquid is poured in through the opening 72 to fill it to a height slightly below the bottom of the propeller, and the displacer is then again lowered, so as to become partly immersed in the liquid, and thus raise the level of the surrounding liquid in the reservoir 52 and in the box 51 to the required height.

The action of the liquid on the actuating mechanism remains the same. An increase in speed of the engine shaft will cause the propeller to move farther to the left, compressing the spring 37, and the grooved collar 26, acting upon the lever 62 of the throttle valve, through the medium of the lever 63 and the link 64, will move said lever 62 to the right, partly closing the throttle valve, and diminishing the amount of steam admitted to the cylinder, thus reducing the speed of the engine shaft.

A fall in speed will cause the governor to act in the opposite direction, and cause the supply of steam to be increased, so as to bring the engine shaft to the normal speed.

Figs. 6 and 7 illustrate a modification in the mechanism, for counterbalancing the force of the reaction of the liquid on the propeller by means of a weight, instead of a spring. In these figures the stationary brackets 65 and 66 are fastened at some convenient points some distance above the governor shaft. A rocking shaft 67, mounted in bearings on said brackets, carries the forked arm 68, the weighted arm 69, carrying the weight 70, and the bar 71. The forked arm 68 engages the groove 33 in the collar 26 by means of the pins 32.

When the governor is at rest, the mechanism will be in the position shown in the figures.

The collar 26 will be held against the bearing 55 by the moment of the weight acting on the lever arm $a-b$.

When the shaft is brought into motion, and the propeller becomes subject to the variable force of the reaction of the liquid, another moment of force is created, which equals to the said variable force of reaction, acting on the constant length of the lever arm $c-d$, and this latter moment may vary greatly, but it will always be equal and opposite to the moment of the constant weight 70, acting on the lever arm $a-b$, as the length of said lever arm will vary directly with the force of the reaction of the water against the propeller, and the effect of the weighted arm will be the same, as that of the spring 37.

Having thus described my invention, what I claim and desire to secure by Letters Patent is:

1. A speed governor comprising a receptacle for a liquid medium, a liquid carried by said receptacle, a driven member, a source causing the motion of said driven member, variable speed gearing interposed between said source and said driven member, a governor shaft, driven at a rate of speed varying with the speed of said driven member, a screw propeller slidably mounted on said governor shaft, rotating in unison with it, adapted to act upon said liquid, moving it in the direction of said shaft, and creating a variable reacting force in the opposite direction, acting on the said propeller, means, acting yieldingly, adapted to counterbalance the said variable reacting force, and means, connecting said propeller and said variable speed gearing acting to change the ratio of said gearing in order to rectify the irregularities in the rate of speed of said driven member due to the irregularities in the resistance to said member or to the irregularity of said source.

2. A governor for controlling the rate of speed of a driven shaft comprising a line of shafting, a driven shaft receiving motion therefrom, variable speed gearing mechanism interposed between said line of shafting and said driven shaft, an actuating member operated to run at a rate of speed varying with the speed of said driven member and arranged to vary in position with the variation of the speed of said driven member and means connecting said actuating member with said variable speed gearing adapted to change the ratio of said gearing.

3. A speed governor comprising a receptacle for a liquid medium, a liquid carried by said receptacle, a driven member, a source, causing the motion of said driven member, variable speed gearing interposed between said source and said driven member, a governor shaft, driven at a rate of speed varying with the speed of said driven member, a screw propeller, driven by said governor shaft, so as to act upon said liquid, creating a reaction force in a definite direction, means, acting yieldingly, adapted to counterbalance the said reacting force, and mechanism, acted upon by the said reacting and counterbalancing forces, adapted to vary its position at each variation of the intensity of said forces, and to determine by such variation of position the variation in the ratio of gearing between said source and said driven member.

4. A speed governor comprising a receptacle for a liquid medium, a liquid carried by said receptacle, a driven member, a source, causing the motion of said member, variable speed gearing interposed between said source and said driven member, a screw propeller, operated by said driven member, so as to act upon said liquid, creating a force of reaction upon said propeller, means, acting yieldingly, adapted to counterbalance said reacting force, means, connecting said propeller with said source, adapted to determine the action of the latter by the intensity of the opposing forces upon said propeller, and means for changing the depth of action of said propeller upon said liquid, for the purpose of increasing or diminishing the force of reaction of said liquid.

5. In a speed governor stationary bearings, a receptacle for a liquid medium, comprising a closed cylindrical casing, provided with trunnions, located eccentrically with respect to the center of said casing, and mounted in said stationary bearings, a propeller shaft, passing through said trunnions, a propeller carried by said shaft, located inside said casing, a liquid medium partly filling said receptacle, and means for turning said casing around in the bearings, so as to raise or lower the surface of the liquid, thus immersing the said propeller to a greater or less extent, for the purpose of changing the adjustment of the governor for the desired rate of speed.

6. A speed governor comprising a driving shaft, a cone pulley carried by said shaft, a driven shaft, a cone pulley carried by said driven shaft, the two said pulleys being so placed, as to face in opposite directions, and to leave a narrow space between their adjoining surfaces, an endless belt, working in said narrow space, forming a friction contact between said cones, a receptacle for a liquid medium, a liquid carried by said receptacle, a propeller within said receptacle, connected to said driven shaft, so as to act upon said liquid, creating a reacting force, means, acting yieldingly, adapted to counterbalance said force, and means, connecting said propeller with said endless belt, for the purpose of shifting the latter along the said narrow space.

7. A speed governor comprising a driving shaft, a cone pulley carried by said shaft, a driven shaft, a cone pulley carried by said driven shaft, the two said pulleys being so placed, as to face in opposite directions, and to leave a narrow space between their adjoining surfaces, an endless belt working in said narrow space, forming a friction contact between said cones, and adapted to move along said narrow space, a propeller connected with said driven shaft, held balanced by a force, varying with the speed of the propeller, and caused by the reaction of a liquid, and an opposing force, varying with the position of the said propeller, and means for connecting said endless belt with said propeller.

8. A speed governor comprising a source of energy, a driven member, variable speed gearing interposed between said source and said driven member, a screw propeller, caused to revolve by said driven member, adapted to move axially, and to be balanced by a force, varying with the speed of the propeller, and caused by the reaction of a liquid upon said propeller, and by an opposing force, varying with the location of said propeller, and means for connecting said propeller with said source, so as to determine by the location of said propeller the ratio of gearing between said source and said driven member.

9. A speed governor comprising an immersing liquid, a source of energy, a driven member, variable speed gearing interposed between said source and said driven member, a screw propeller, caused to revolve by said driven member, adapted to move axially, and to be balanced by a force, varying with the speed of the propeller, and caused by the reaction of said immersing liquid upon said propeller, and by an opposing force, varying with the location of said propeller, and means for increasing or diminishing the degree of immersion of said propeller, so as to increase or diminish the said opposing forces, for the purpose of changing the adjustment of the governor for the desired rate of speed.

J. W. HOAG.

Witnesses:
F. V. SCHILLER,
NETTIE HAMILTON.